US012759575B2

(12) United States Patent
Hata et al.

(10) Patent No.: US 12,759,575 B2
(45) Date of Patent: Oct. 13, 2026

(54) DRIVER ASSISTANCE SYSTEM

(71) Applicant: TOYOTA JIDOSHA KABUSHIKI KAISHA, Toyota (JP)

(72) Inventors: Ryosuke Hata, Mishima (JP); Toshihiko Seki, Hadano (JP); Atsushi Kodama, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 11 days.

(21) Appl. No.: 19/018,571

(22) Filed: Jan. 13, 2025

(65) Prior Publication Data

US 2025/0276711 A1 Sep. 4, 2025

(30) Foreign Application Priority Data

Mar. 1, 2024 (JP) ................................ 2024-031091

(51) Int. Cl.
*B60W 50/14* (2020.01)
*B60W 50/00* (2006.01)

(52) U.S. Cl.
CPC ..... *B60W 50/14* (2013.01); *B60W 2050/0083* (2013.01); *B60W 2050/143* (2013.01); *B60W 2050/146* (2013.01)

(58) Field of Classification Search
CPC ......... B60W 50/14; B60W 2050/0083; B60W 2050/143; B60W 2050/146
See application file for complete search history.

(56) References Cited

U.S. PATENT DOCUMENTS 11,823,230 B2 * 11/2023 Yasui ................. G01C 21/3697
2017/0225677 A1 * 8/2017 Yoshida .............. B60W 30/025
2018/0113454 A1 * 4/2018 Emura .................. B60W 50/14
2020/0172123 A1 * 6/2020 Kubota ............. B60W 60/0053
2020/0239027 A1 * 7/2020 Watanabe ............ B60W 50/14
2020/0279441 A1 9/2020 Inoue
2023/0278565 A1 * 9/2023 Okabe ................... B60W 40/09 701/1
2024/0034362 A1 * 2/2024 Oba .................. B60W 60/0051

FOREIGN PATENT DOCUMENTS

JP 2020-140159 A 9/2020

* cited by examiner

*Primary Examiner* — Mohamed Barakat
(74) *Attorney, Agent, or Firm* — SoraIP, Inc.

(57) ABSTRACT

The driver assistance system acquires the vehicle control content in a case where it is assumed that the automated driving control is performed during the manual driving of the vehicle by the driver. The driver assistance system acquires the driver operation content, which is the content of the driving operation of the vehicle by the driver, during the manual driving of the vehicle by the driver. The driver assistance system notifies the driver of feedback related to the driving operation on the basis of a result of the comparison between the vehicle control content and the driver operation content.

2 Claims, 6 Drawing Sheets

10: DRIVER ASSISTANCE SYSTEM

DRIVER ASSISTANCE SYSTEM

CROSS-REFERENCE TO RELATED APPLICATION

This application claims priority to Japanese Patent Application No. 2024-031091 filed on Mar. 1, 2024, incorporated herein by reference in its entirety.

BACKGROUND

1. Technical Field

The present disclosure relates to technology for notifying a driver of a vehicle with feedback related to driving operations.

2. Description of Related Art

Japanese Unexamined Patent Application Publication No. 2020-140159 (JP 2020-140159 A) discloses an instruction system for instructing a driver that is driving a vehicle regrading driving operations. The instruction system notifies the driver, who is driving, of operation contents determined based on a current state of the vehicle and a past traveling record thereof.

SUMMARY

Feedback (notification) based on the traveling record is not based on an actual state of the object vehicle, and accordingly may not necessarily be optimal feedback. In particular, it is expected that validity of the feedback will be low when there are few travel records accumulated regarding that traveling road.

One object of the present disclosure is to perform notification of appropriate feedback, with respect to driving operation contents of the driver, by a method that is not dependent on the travel record.

A first aspect relates to a driver assistance system for a driver of a vehicle. The driver assistance system includes a control device that is equipped with a function of automated driving control.

The control device acquires a vehicle control content when assumption is made that the automated driving control will be performed, during manual driving of the vehicle by the driver.

The control device acquires a driver operation content that is a content of a driving operation of the vehicle by the driver, during manual driving of the vehicle by the driver.

The control device notifies the driver of feedback regarding the driving operation, based on a result of comparison between the vehicle control content and the driver operation content.

According to the first aspect, the driver assistance system notifies the driver of the feedback based on the comparison between the vehicle control content and the operation content by the driver, when it is assumed that automated driving control will be performed, during manual driving of the vehicle by the driver. The vehicle control content is determined based on the current state of the vehicle rather than the traveling record, and accordingly the driver can be notified of appropriate feedback without depending on the traveling record.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiments of the present disclosure will be described with reference to the accompanying drawings.

1. Driver Assistance System

Figure 1:
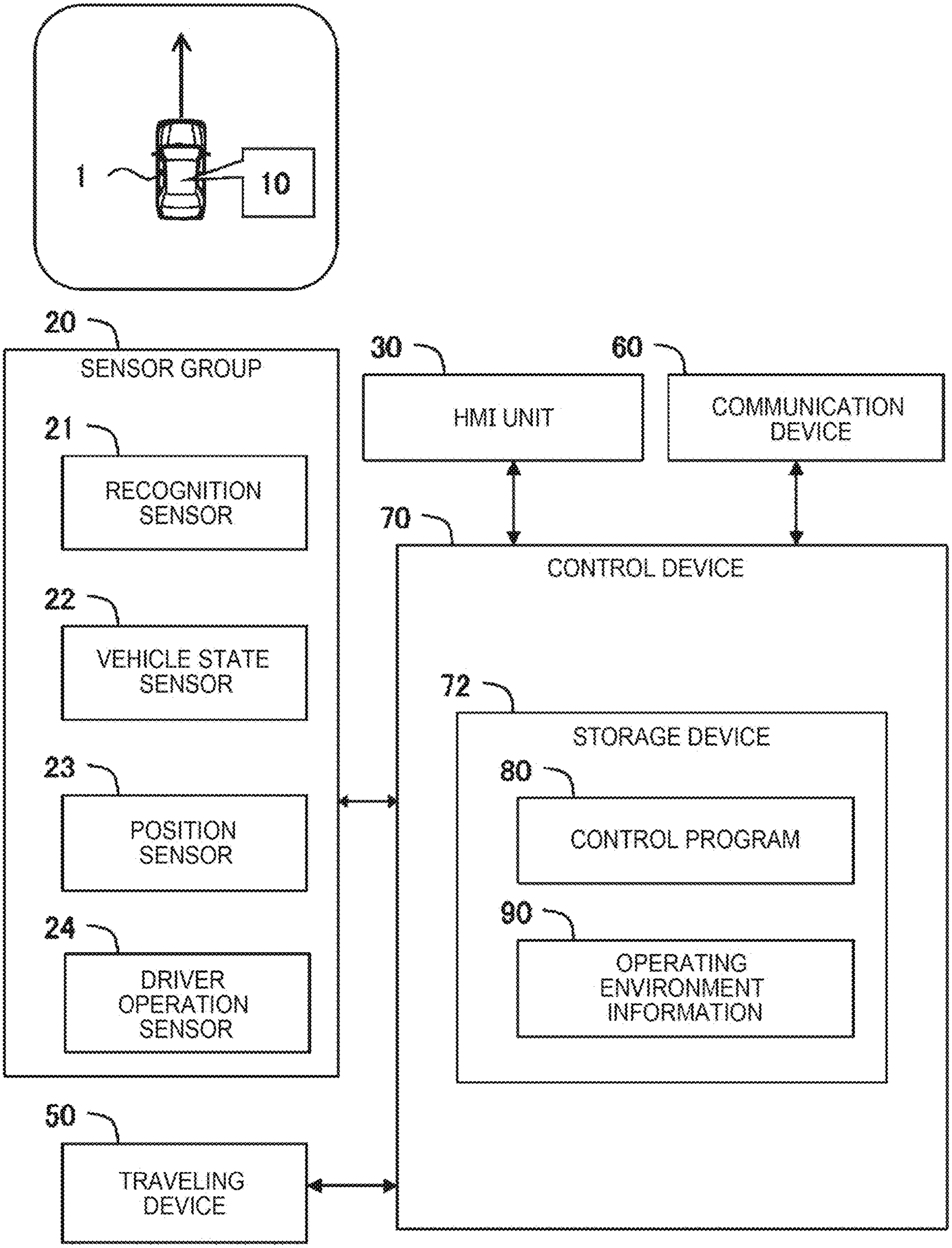
FIG. 1 is a conceptual diagram for explaining an outline of a driver assistance system according to the present embodiment.

FIG. 1 is a conceptual diagram for explaining an outline of a driver assistance system 10 according to the present embodiment. The driver assistance system 10 controls the vehicle 1. Typically, the driver assistance system 10 is mounted on the vehicle 1.

The driver assistance system 10 includes a sensor group 20, an HMI (Human Machine Interface) unit 30, a traveling device 50, a communication device 60, and a control device 70. At least the sensor group 20, HMI unit 30, the traveling device 50, and the communication device 60 are mounted on the vehicle 1.

The traveling device 50 (actuator) includes a steering device, a driving device, and a braking device. The steering device will turn the wheel. For example, the steering device includes a power steering (EPS: Electric Power Steering) device. The driving device is a power source that generates a driving force. Examples of the driving device include an engine, an electric motor, and an in-wheel motor. The braking device generates a braking force.

The sensor group 20 includes a recognition sensor 21, a vehicle state sensor 22, a position sensor 23, and a driver operation sensor 24. The recognition sensor 21 recognizes (detects) a situation around the vehicle 1. Examples of the recognition sensor 21 include a camera LIDAR (Laser Imaging Detection and Ranging), a radar, and the like. The vehicle state sensor 22 detects the state of the vehicle 1. For example, the vehicle state sensor 22 includes a speed sensor, an acceleration sensor, a yaw rate sensor, a steering angle sensor, and the like. The position sensor 23 detects the position and the azimuth of the vehicle 1. For example, the position sensor 23 includes a GNSS (Global Navigation Satellite System).

The driver operation sensor 24 acquires the presence or absence of a driving operation by the driver of the vehicle 1 and the operation amount thereof. For example, the driver operation sensor 24 includes a throttle valve opening degree sensor, an engine speed sensor, a braking force sensor, an EPS torque sensor, and the like. While the driver is performing the manual operation, the presence or absence of the driving operation by the driver and the operation amount thereof can be acquired on the basis of changes in the throttle valve opening degree, the engine speed, the braking force, EPS torque, and the like. As another example, the driver operation sensor 24 may include a steering sensor, an accelerator pedal sensor, and a brake pedal sensor. The steering sensor detects a steering amount of a steering wheel. The accelerator pedal sensor detects a stroke amount of the accelerator pedal. The brake pedal sensor detects a stroke amount of the brake pedal.

HMI unit 30 is an interface for providing information to a driver of the vehicle 1 and receiving information from the driver. Specifically, HMI unit 30 includes an inputting device and an outputting device. Examples of the input device include a touch panel, a switch, and a microphone. Examples of the output device include a display device, a speaker, an in-vehicle LED, and the like. Examples of the display device include a liquid crystal panel and an organic EL panel. HMI unit 30 may include a HUD (Head Up Display), a vibrator, and the like.

The communication device 60 communicates with the outside via a communication network. Examples of the communication scheme include mobile communication such as 5G, and radio LAN.

The control device 70 is a computer that controls the vehicle 1. Typically, the control device 70 is mounted on the vehicle 1. However, a part of the control device 70 may be disposed in an external device, and the vehicle 1 may be controlled remotely. The control device 70 executes various processes. For example, the control device 70 includes a processing circuitry such as a CPU (Central Processing Unit). The processing circuit may also be referred to as a processor. The control device 70 includes one or more storage devices 72 (hereinafter simply referred to as storage devices 72). The storage device 72 stores various types of information. Examples of the storage device 72 include volatile memory, non-volatile memory, HDD (Hard Disk Drive), SSD (Solid State Drive), and the like.

The control program 80 is a computer program for controlling the vehicle 1. The function of the control device 70 may be realized by cooperation of the control device 70 that executes the control program 80 and the storage device 72. The control program 80 is stored in the storage device 72. Alternatively, the control program 80 may be recorded in a computer-readable recording medium.

The control device 70 acquires the driving environment information 90 indicating the driving environment of the vehicle 1. The driving environment information 90 is stored in the storage device 72.

Figure 2:
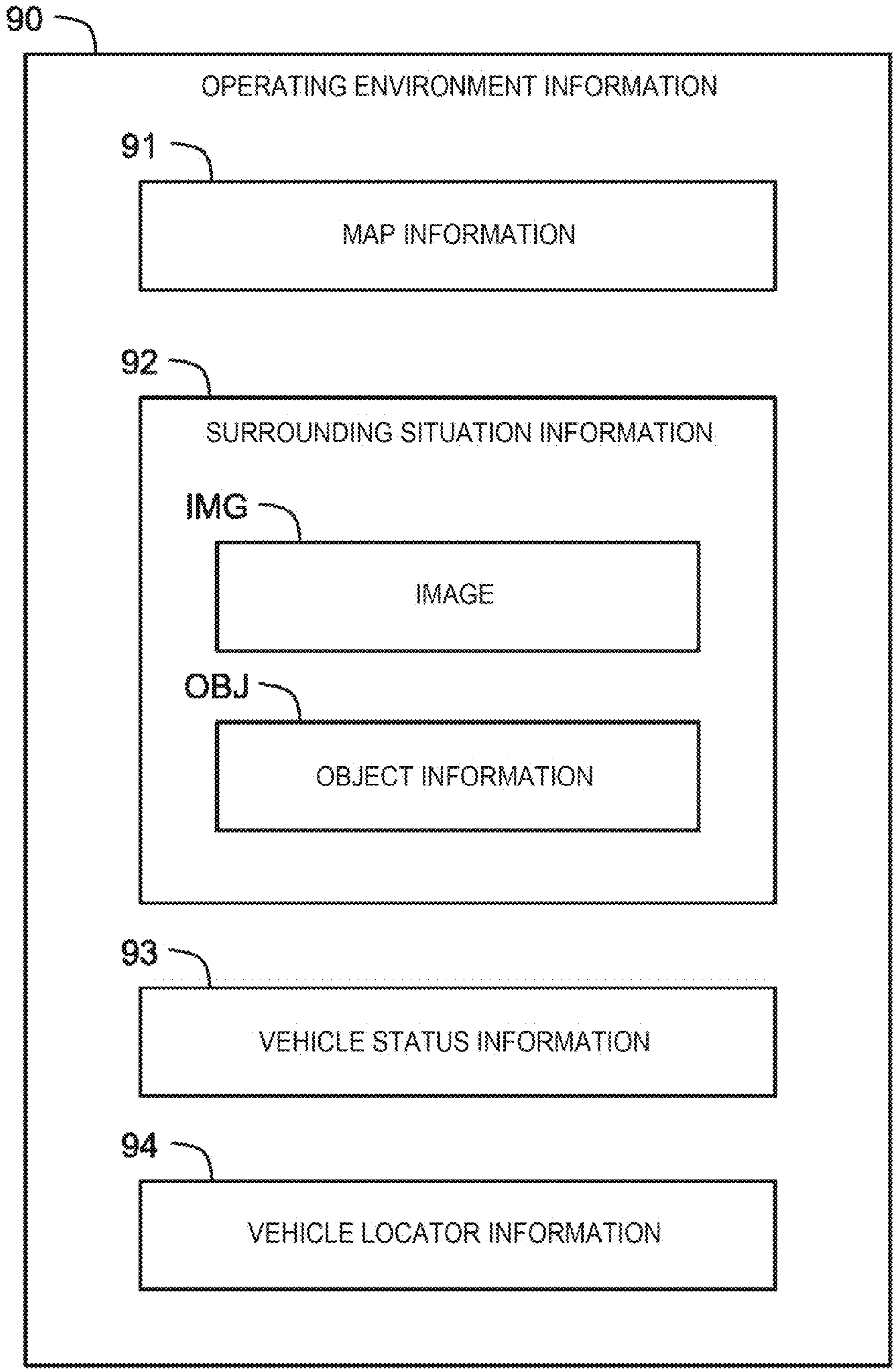
FIG. 2 is a block diagram illustrating an example of driving environment information according to the present embodiment.

FIG. 2 is a block diagram illustrating an example of the driving environment information 90. The driving environment information 90 includes map information 91, surrounding situation information 92, vehicle state information 93, and vehicle position information 94.

The map information 91 includes a general navigation map. The map information 91 may indicate a lane arrangement or a road shape. The map information 91 may include positional information such as a structure, a traffic light, a sign, and the like. The control device 70 acquires map information 91 of a necessary area from the map database. The map database may be stored in the storage device 72 or may be stored in a map management device outside the vehicle 1. In the latter case, the control device 70 communicates with the map management device via the communication device 60, and acquires necessary map information 91.

The surrounding situation information 92 is information obtained based on a recognition result by the recognition sensor 21, and indicates a situation around the vehicle 1. The control device 70 recognizes a situation around the vehicle 1 using the recognition sensor 21, and acquires the surrounding situation information 92. For example, the surrounding situation information 92 includes image IMG captured by the camera. Alternatively, the surrounding situation information 92 includes point cloud information obtained by LIDAR.

The surrounding situation information 92 further includes object information OBJ related to objects (targets) around the vehicles 1. Examples of the object include pedestrians, bicycles, motorcycles, other vehicles (preceding vehicles, parked vehicles, and the like), white lines, traffic lights, structures (e.g., poles, pedestrian bridges), signs, obstacles, and the like. The object information OBJ indicates the relative position and the relative velocity of the object with respect to the vehicle 1. For example, an object can be identified and the relative position of the object can be calculated by analyzing the image IMG obtained by the camera. It is also possible to identify an object based on the point cloud data obtained by LIDAR, and to acquire the relative position and the relative velocity of the object. The control device 70 may track the recognized object. The object information OBJ then also includes the trajectory information of the recognized object.

The vehicle state information 93 is information detected by the vehicle state sensor 22 and indicates the state of the vehicle 1. The state of the vehicle 1 includes vehicle speed, acceleration, yaw rate, steering angle, and the like. The control device 70 acquires the vehicle state information 93 from the vehicle state sensor 22. The vehicle state information 93 may indicate a driving state (automatic driving/manual driving) of the vehicle 1.

The vehicle position information 94 is information indicating the current position of the vehicle 1. The control device 70 acquires the vehicle position information 94 from the detection result by the position sensor 23. Further, the control device 70 may acquire the highly accurate vehicle-position information 94 by a well-known self-position estimation process (Localization) using the object information OBJ and the map information 91.

Further, the control device 70 executes vehicle travel control for controlling the travel of the vehicle 1. The vehicle travel control includes steering control, acceleration control, and deceleration control. The control device 70 executes vehicle travel control by controlling the traveling device 50 (a steering device, a drive device, and a braking device). More specifically, the control device 70 calculates a control amount (actuator control amount) of the traveling device 50, and controls the traveling device 50 in accordance with the actuator control amount.

Further, the control device 70 performs automated driving control for controlling autonomous driving of the vehicle 1. Here, the autonomous driving means that at least a part of the steering, the acceleration, and the deceleration of the vehicle 1 is automatically performed independently of the operation of the driver. As an example, level 3 or more automated driving may be performed. The control device 70 generates a travel plan of the vehicle 1 based on the driving environment information 90. Examples of the traveling plan include maintaining the current traveling lane, changing lanes, turning right and left, avoiding collision with an object, and the like. More specifically, the travel plan includes a route plan and a speed plan of the vehicle 1. The route plan is a set of target positions of the vehicle 1. The velocity plan is a set of target velocities for each target position. The combination of path planning and velocity planning is also referred to as "target trajectory". That is, the target trajectory includes a target position and a target speed of the vehicle 1. The control device 70 performs vehicle travel control so that the vehicle 1 follows the target trajectory TR. The control device 70 may perform automated driving control while performing optimization by model-predictive control (MPC: Model Predictive Control).

2. Feedback Notification 2-1. Overview of Feedback Notification

Figure 3:
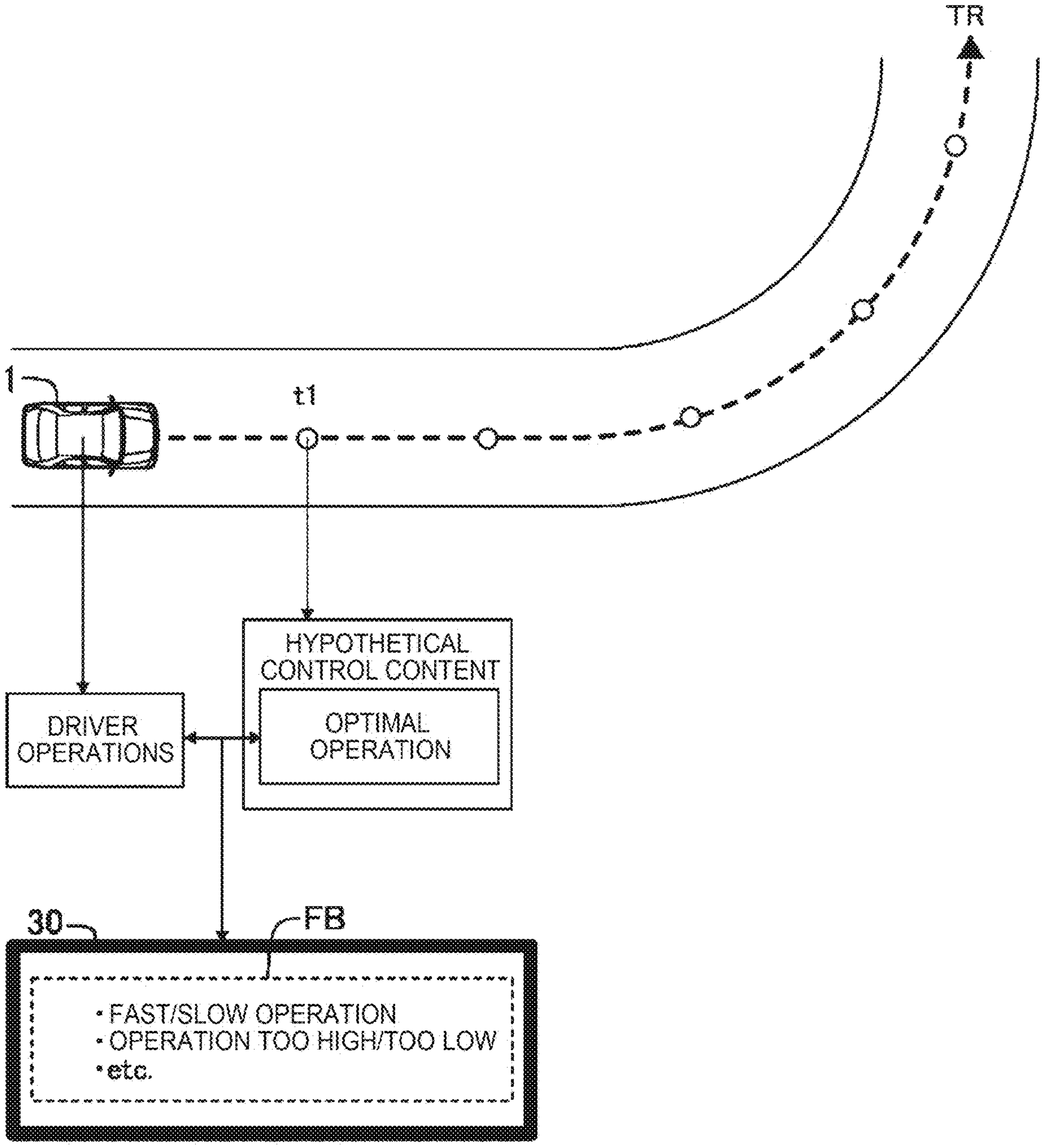
FIG. 3 is a schematic diagram illustrating a state in which the driver assistance system according to the present embodiment notifies the driver of feedback.

FIG. 3 is a schematic diagram illustrating a state in which the driver assistance system 10 notifies the driver of the feedback FB. It is assumed that the vehicle 1 includes the driver assistance system 10 and is in a manual driving state by a driver. When the vehicle 1 enters the curve from the straight section, in order to safely exit the curve, the driver needs to decelerate the vehicle 1 by operating the brake. The content of the optimum braking operation in this case depends on the current state of the vehicle 1 (vehicle speed, acceleration, yaw rate, steering angle, etc.). The braking operation content includes at least a timing of the braking operation and a braking operation amount. The driver performs a braking operation that he/she thinks is appropriate, but it is not known how much the braking operation differs from the optimum operation.

Therefore, the driver assistance system 10 according to the present disclosure acquires the optimum driving operation content by calculation based on the automated driving control. The driver assistance system 10 compares the acquired optimum driving operation content with the actual driving operation content of the driver, and notifies a feedback FB of the driving operation by the driver. Since the feedback FB is based on the present condition of the vehicle 1, it can be said that the feedback is more valid than the feedback based on the previous travel records. The driving operation to be the target of the feedback FB of the driver assistance system 10 includes an accelerator operation, a steering operation, and the like in addition to the braking operation exemplified above. Specific embodiments thereof will be described below.

The control device 70 acquires the vehicle control content when it is assumed that the automated driving control is performed. In FIG. 3, the control device 70 included in the driver assistance system 10 generates the target trajectory TR. The control device 70 performs automated driving control so that the vehicles 1 follow the target trajectory TR. As described above, since the target trajectory is generated based on the driving environment information 90, it can be said that the target trajectory is an optimal trajectory that is generated based on the current state of the vehicle 1.

The control device 70 acquires the vehicle control content (hereinafter, referred to as "assumed control content") in a case where it is assumed that the automated driving control is performed. In the embodiment of FIG. 3, the vehicle control content required when the vehicle 1 is assumed to travel following the target trajectory TR by automated driving control is acquired. The vehicle control content includes a timing for controlling the traveling device 50 (actuator) and an amount for controlling.

The control device 70 calculates the operation content of the traveling device 50 (actuator) corresponding to the assumed control content. The operation content of the actuator corresponding to the assumed control content can be referred to as the optimum operation content when the driver performs the driving operation. Therefore, in the following description, the operation content of the actuator corresponding to the assumed control content is referred to as "optimum operation content". In the automated driving control, the control device 70 controls the behavior of the vehicle 1 by controlling the actuator so that the vehicle 1 follows the target trajectory TR. Therefore, it can be said that the optimum operation content is included in the assumed control content.

The control device 70 acquires, via the driver operation sensor 24, the driver operation content that is the content of the driving operation of the vehicle 1 by the driver. The driver operation content is an operation content of the traveling device 50 (actuator) actually operated by the driver, and includes a timing at which a driving operation is performed by the driver and an amount of the operation.

The control device 70 compares the optimum operation content with the driver operation content. The control device 70 is configured to notify the driver of the feedback FB related to the driving operation. Examples of the content of the feedback FB include an operation timing of the driver being too early/too late, or an operation amount of the driver being too small/too large. The feedback FB is notified via HMI unit 30, for example. Audio notifications and visual displays (meters, displays, in-vehicle LED, and the like) using speakers correspond to notifications via HMI unit 30. Alternatively, the notification may be made by vibrating the steering wheel or the seat in a specific pattern.

2-2. Effect

As described above, the driver assistance system 10 notifies the driver of the feedback FB related to the driving operation of the driver based on the present condition of the vehicle 1. JP 2020-140159 A discloses a system in which feedback is provided with reference to past travel records of the same travel path. However, the travel record referred to in such a system is not necessarily an optimal feedback because it is not based on the actual state of the target vehicle. In particular, it is expected that the validity of the feedback will be further reduced if there are few travel records accumulated for the travel path. On the other hand, the driver assistance system 10 notifies the feedback FB based on the actual vehicle condition of the vehicle 1. Accordingly, an appropriate feedback FB can be notified without depending on the travel recording.

The driver assistance system 10 is particularly effective for guidance of a driving trainer. When the driving operation of the driving trainer does not conform to the optimum operation content, the driver assistance system 10 notifies the driving trainer of feedback FB regarding whether the operation timing is good or bad and the strength of the operation. The driver can train while confirming the difference between the operation of the driver and the optimum operation content, so that it is possible to expect improvement of the efficient driving technology. The location to which the driver assistance system 10 can be applied is not limited to a specific area such as a driving training area.

3. Viewpoint of Manipulated Variable and Manipulation Timing

Figure 4:
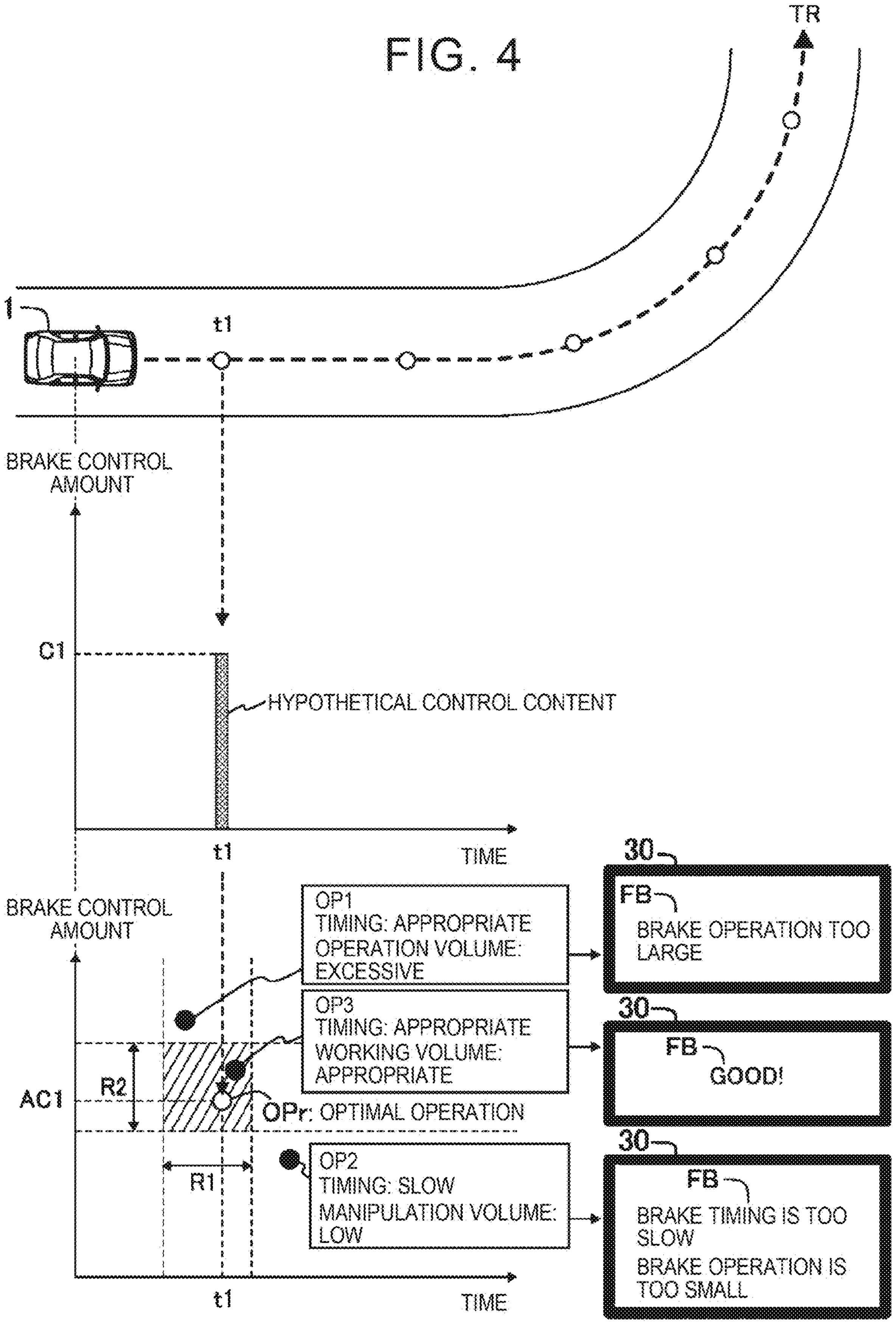
FIG. 4 is a more detailed representation of the situation in FIG. 3.

FIG. 4 is a diagram illustrating the situation in FIG. 3 in more detail. In FIG. 4, the vehicle control timing (brake control timing) based on the assumed control content is time t1. Further, the vehicle control amount (brake control amount) based on the assumed control content at the time t1 is the control amount C1. That is, assuming that the vehicle 1 is under automated driving control, the control device 70 performs braking control of the control amount C1 at the time t1 in order to cause the vehicle 1 to follow the target trajectory TR.

The control device 70 calculates the optimum operation content that is the operation content of the actuator corresponding to the assumed control content. In FIG. 4, the optimum actuator operating amount AC1 is calculated based on the control amount C1. That is, the control device 70 calculates the optimum manipulation content (t1, AC1) from the hypothetical control content (t1, C1). Therefore, it can be said that the closer the driver operation content by the driver is to the optimum operation content calculated by the control device 70, the closer the driving operation of the driver is to the ideal.

The driver assistance system 10 compares the driver operation content (including the driving operation timing and the driving operation amount) with a predetermined range including the optimum operation content, thereby branching the presence or absence of the feedback FB and the content thereof. When the driver operation content is out of the predetermined range, a feedback FB indicating that the driver operation is not appropriate is notified. When the driver operation content is within a predetermined range, a feedback FB indicating that the driver operation is appropriate may be notified.

In FIG. 4, the optimum operation OPr indicates an optimum operation content (t1, AC1). The temporal range including the time t1 is defined as the first range R1. The range of the operating amount including the actuator operating amount AC1 is set as the second range R2. When the driver performs the operation OP1, the operation timing is within the first range R1 (appropriate), and the operation amount is located outside the second range R2 (excessive). A feedback FB indicating that the manipulated variable is excessive is notified. At this time, the operation timing may be fed back together to the effect that it is appropriate. When the driver performs the operation OP2, the operation timing is outside the first range R1 (slow), and the operation amount is outside the second range R2 (too small). A feedback FB indicating that the operation timing is slow and the operation amount is too small is notified. When the driver performs the operation OP3, the operation timing is within the first range and the operation amount is within the second range. In such cases, a feedback FB (e.g., GOOD etc.) indicating that the driver-operated content is appropriate may be notified. In addition, when the operation of the driver is not detected from the time t1 for a predetermined period of time, the control device 70 may consider that there is no operation by the driver and notify the driver of a feedback FB that prompts the driver to perform the operation.

Note that the first range and the second range do not need to be centered on the optimum operation content. For example, in the braking operation, if the operation timing is early, it means that the vehicle 1 starts to decelerate quickly. This can be said to be the shift of the "safety side". On the other hand, when the operation timing of the brake is slow, the vehicle 1 starts to decelerate slowly, so that it can be said that the shift is on the "dangerous side". Therefore, it is reasonable to set the allowable range for the operation on the safety side to be wider than the optimum operation content, and the allowable range for the operation on the dangerous side to be narrower than the optimum operation content.

4. Configuration Example of the Driver Assistance System

Figure 5:
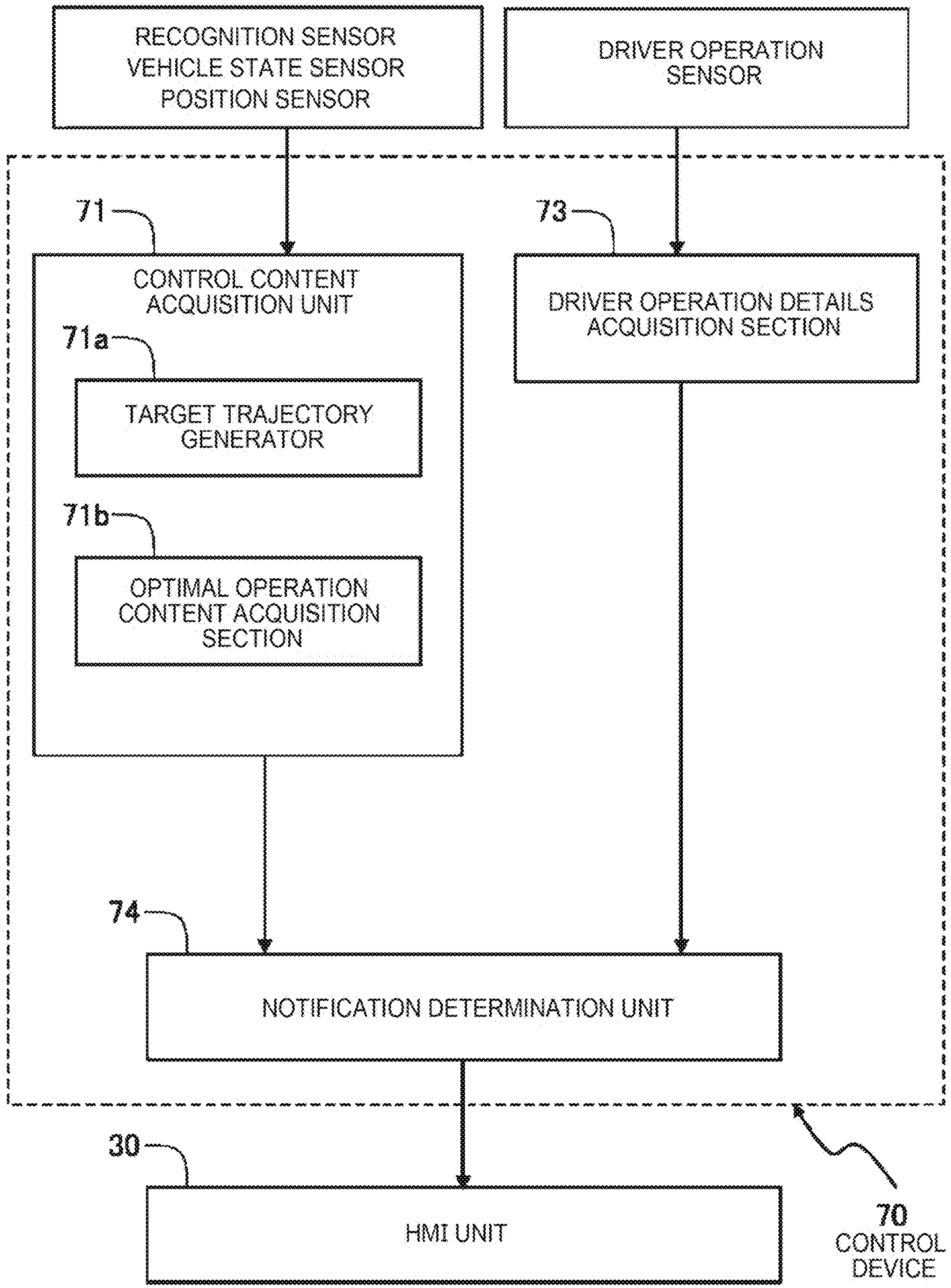
FIG. 5 is a block-diagram illustrating a detailed configuration of the driver assistance system according to the present embodiment.

FIG. 5 is a block diagram illustrating a detailed configuration example of the driver assistance system 10.

The control content acquisition unit 71 acquires various pieces of information from the recognition sensor 21, the vehicle state sensor 22, and the position sensor 23. The target trajectory generation unit 71*a* generates a target trajectory TR based on the data acquired by the control content acquisition unit 71. The control content acquisition unit 71 acquires the hypothetical control content based on the generated target trajectory TR. The optimum operation content acquiring unit 71*b* calculates the optimum operation content based on the hypothetical control content.

The driver operation content acquisition unit 73 acquires information on the driver operation content from the driver operation sensor 24. The driver operation content includes an operation timing and an operation amount of the driver.

The notification determination unit 74 receives the optimum operation content from the control content acquisition unit 71 and the driver operation content from the driver operation content acquisition unit 73. The notification determination unit 74 compares the driver operation content with the optimum operation content. The notification determination unit 74 determines whether to provide a notification including a feedback FB and the content of the feedback FB. As illustrated in FIG. 4, the condition for notifying the feedback FB and the content of the feedback FB may be determined based on a comparison between the operation content of the drivers and a predetermined range including the optimum operation content. When the feedback FB is notified, the notification determination unit 74 performs notification via HMI unit 30.

Figure 6:
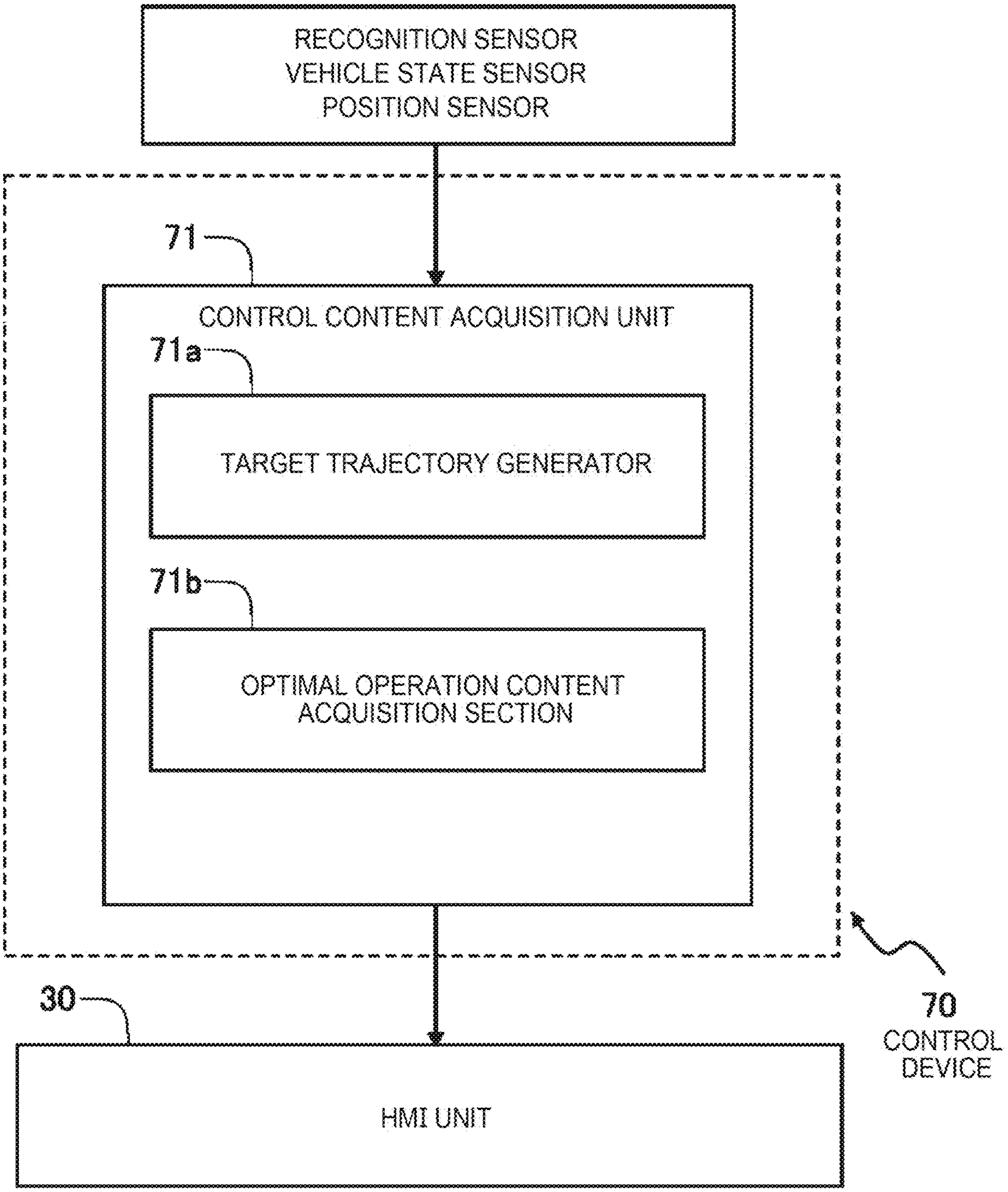
FIG. 6 is a block diagram illustrating a modification of the driver assistance system according to the present embodiment.

FIG. 6 is a block diagram illustrating a modification of the driver assistance system 10. In the case of the example illustrated in FIG. 6, the driver assistance system 10 always notifies the optimum operation content. Therefore, unlike the example of FIG. 5, the driver operation content acquisition unit 73 and the notification determination unit 74 are unnecessary. In this case, the driver can always know the optimum operation content regardless of the operation content of the driver. The form of notification of the feedback FB is preferably such that the drivers do not feel troublesome. For example, it is preferable to notify by color change of the in-vehicle LED rather than by audio notification.

Further, the machine learning model may calculate the optimum operation content based on the information acquired by the sensor group 20. By using the machine learning model in combination, it is possible to determine an optimum operation content in consideration of the driver's individual driving habits and the characteristics of the vehicle 1.

In addition, at least some of the settings related to the feedback FB may be changeable by the drivers. For example, the first range R1 and the second range R2 may be adjustable according to the preference of the drivers. Through such a setting, the driver can appropriately adjust the frequency and content of the notification.

What is claimed is:

1. A driver assistance system for a driver of a vehicle, the driver assistance system comprising a processor configured to execute an automated driving control, wherein the processor is further configured to acquire vehicle control data for controlling the vehicle, when assumption is made that the automated driving control will be performed during manual driving of the vehicle by the driver, acquire driver operation data of a driving operation of the vehicle by the driver, and notify the driver of feedback regarding the driving operation, based on a result of comparison between the vehicle control data and the driver operation data, the driver operation data includes a driving operation timing, the vehicle control data includes a vehicle control timing, the processor is further configured to, in a case where the driving operation timing is outside a first range set with respect to the vehicle control timing, notify the driver of the feedback indicating that the driving operation timing is not appropriate, the first range includes a safety side range and a dangerous side range, the safety side range being a range in which a driving operation timing is earlier than the vehicle control timing, the dangerous side range being a range in which the driving operation timing is later than the vehicle control timing, and the first range is set such that the safety side range is wider than the dangerous side range.

2. The driver assistance system according to claim 1, wherein:

the driver operation data includes a driving operation amount;

the vehicle control data includes a vehicle control amount; and the processor is further configured to, in a case where the driving operation amount is outside a second range set with respect to the vehicle control amount, notify the driver of the feedback indicating that the driving operation amount is not appropriate.

* * * * *